United States Patent [19]
Durfee, Jr.

[11] Patent Number: 5,505,437
[45] Date of Patent: Apr. 9, 1996

[54] TWO STATION MACHINING VISE WITH REMOVABLE AND OFF-SETTABLE JAWS

[76] Inventor: David L. Durfee, Jr., 711 Marshall Rd., Meadville, Pa. 16335

[21] Appl. No.: 229,806

[22] Filed: Apr. 19, 1994

Related U.S. Application Data

[63] Continuation-in-part of Ser. No. 113,048, Aug. 31, 1993, Pat. No. 5,458,321.

[51] Int. Cl.⁶ .................................................. B25B 1/10
[52] U.S. Cl. ........................... 269/43; 269/136; 269/154; 269/244; 269/282; 269/906
[58] Field of Search .................. 269/43, 88, 136, 269/138, 154, 152, 153, 279, 282, 242, 244, 906

[56] References Cited

U.S. PATENT DOCUMENTS

| | | |
|---|---|---|
| 4,098,500 | 7/1978 | Lenz . |
| 4,529,183 | 7/1985 | Krason et al. . |
| 4,685,663 | 8/1987 | Jorgensen . |
| 4,923,186 | 5/1990 | Durfee, Jr. . |
| 4,934,674 | 6/1990 | Bernstein . |
| 4,966,350 | 10/1990 | Chick . |
| 5,022,636 | 6/1991 | Swann . |
| 5,024,427 | 6/1991 | Swann . |
| 5,037,075 | 8/1991 | Durfee, Jr. . |
| 5,098,073 | 3/1992 | Lenz ........................................ 269/43 |

OTHER PUBLICATIONS

Chick Vise Fixturing Brochure, Chick Machine Tool, Inc. Warrendale, PA 15086, pp. 1–12.
Kurt Doublelock Brochure, Kurt Manufacturing Company, Minn. MN 55413.

*Primary Examiner*—Robert C. Watson
*Attorney, Agent, or Firm*—Oliff & Berridge

[57] ABSTRACT

In a wide-opening vise having two movable jaws and a fixed center jaw, the movable jaws are easily removed and reset onto associated slides. The slides have upperly projecting bodies with pressure release latches for positively fixing the jaws in position on the slides. Further, a brake and off-set assembly is associated with one movable slide. The combination allows the second movable jaw, after the first movable jaw has engaged a workpiece, to engage and disengage from a workpiece without effecting the engagement of the first movable jaw with its held workpiece. At least two off-set positions are provided for the engagement and disengagement of the second movable jaw.

18 Claims, 15 Drawing Sheets

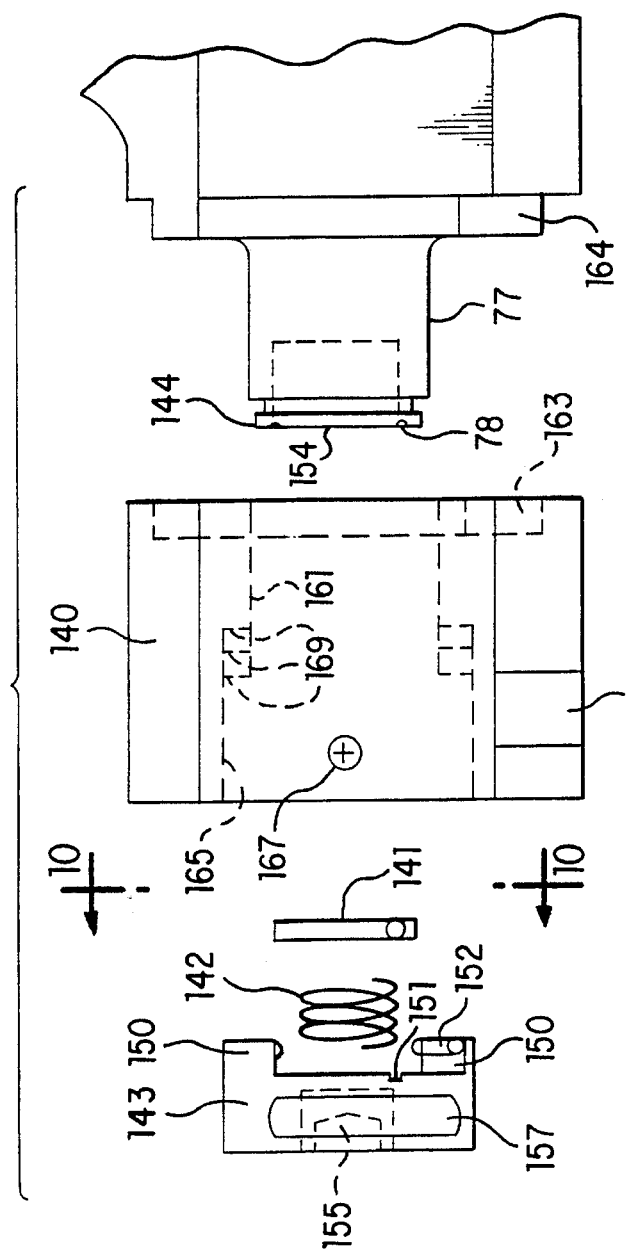
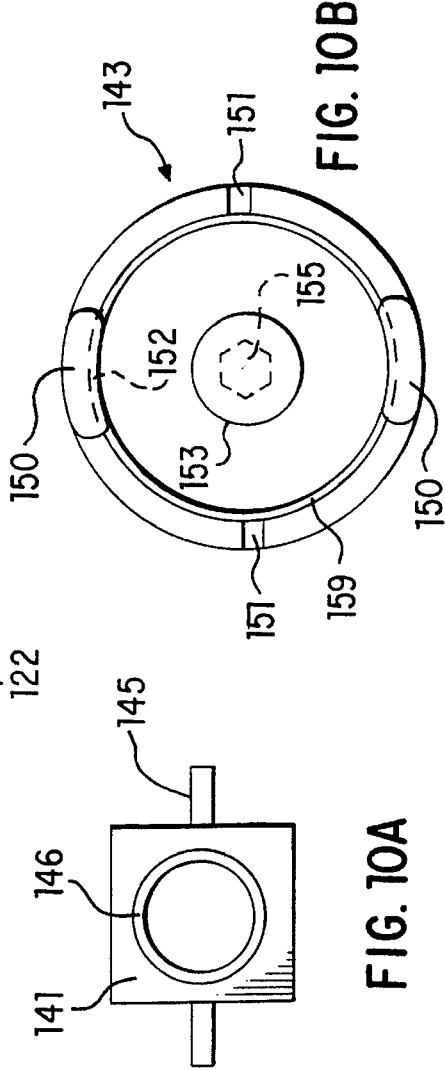
FIG. 9
FIG. 10A
FIG. 10B

TWO STATION MACHINING VISE WITH REMOVABLE AND OFF-SETTABLE JAWS

This is a continuation-in-part of application Ser. No. 08/113,048 filed Aug. 31, 1993 now U.S. Pat. No. 5,458,321.

BACKGROUND OF THE INVENTION

1. Field of the Invention

The invention relates to a vise having a stationary jaw and two movable jaws for use in the precision machining of workpieces

2. Description of Related Art

Two station machining vises are known in the art. U.S. Pat. No. 4,966,350 to Chick discloses a two station device which introduced the concept of a removable stationary jaw bolted to the vise base from above Thus when it is necessary to machine oversize pieces, the stationary jaw could be removed and one of the movable jaws could be fixed in position.

Another two station vise is disclosed in U.S. Pat. No. 4,529,183 to Krason et al. The vise consists of a stationary center jaw and two movable jaws. One movable jaw is fixed positionally on the screw shaft 2 which threadably engages the slide of the second movable jaw. The shaft itself is capable of axial movement within the vise base so as to enable grasping workpieces of different sizes.

U.S. Pat. No. 4,529,183 also discloses mounting removable jaw blocks over upward extensions of the slides. Between a front surface of the slide projection and the inner surface of the cavity of the jaw block is a hemispherical segment for engaging with the surface of the protrusion. The opposite side of the upper protrusion is engaged by a set screw 60 to lock the jaw block onto the slide. Similar constructions for the mounting of jaw blocks are found in U.S. Pat. Nos. 4,098,500 and 4,685,663.

Another method of mounting a jaw block to a slide is disclosed in U.S. Pat. No. 5,024,427 to Swann. As disclosed, the upward extension from the slide has a detent pin on one of the upwardly extending vertical faces a hemispherical opening passing through the extension transverse to the orientation of the detent pin. The jaw block has an opening aligned with the hemispherical opening. A pin, with a handle, is inserted into the opening in the jaw and passes through the hemispherical opening in the slide extension to engage the jaw block to the slide.

Off-set devices or staggered release mechanisms have also been provided in two-station machining vises. One such vise is disclosed in U.S. Pat. No. 4,934,674 to Bernstein. This vise employs a drive shaft having counter threads at opposing ends for engaging the respective movable jaw slides. An assembly at one end of the vise screw allows the movable jaws to be positioned with respect to the stationary jaw and locked into position. Such a mechanism permits a first workpiece to be subjected to a preclamping load before the second workpiece is clamped by the second movable jaw. In this apparatus each time a size difference occurs between the workpieces being positioned at the two workstations, the apparatus must be adjusted by releasing a set screw from the screw shaft and repositioning the screw shaft.

U.S. Pat. No. 5,022,636 to Swann also discloses a locking, staggered release apparatus. In this apparatus, a biasing means is fixed by means of a set screw to the vise base. The biasing means is spring attached to a one of the slides, By properly positioning the biasing means, the slide that is not attached to the biasing means will first engage, through its jaw block, the workpiece at the first workstation and then the second slide attached to the biasing means will engage, by means of its jaw block, the second workpiece at the second workstation. Each time differently sized workpieces are to be machined, the set screw must be released and the position of the biasing means adjusted.

U.S. Pat. No. 5,098,073 to Lenz discloses another method of providing for staggered release of the movable jaws. The apparatus includes a holding block that be positioned on a sleeve to shift the vise screw assembly thereby repositioning the movable jaws relative to the center block. The holding block is a split collar type block that can be loosened so that the sleeve can be slid axially relative to the holding block.

SUMMARY OF THE INVENTION

The invention relates to two-station vise that can hold two workpieces to be machined against oppositely facing surfaces of a stationary jaw mounted to a center of the vise body. The movable jaws move toward and away opposite surfaces of the stationary center jaw for clamping the workpieces therebetween. A threaded screw is rotatably mounted in one movable jaw slide and threadably engages a bore of the second movable jaw slide. The slide of one movable jaw has a hood covered recess and the slide of the other movable jaw has an extension so that the extension may enter the recess to increase the jaw travel and permit the movable jaws to contact the stationary jaw. A brake and off-set assembly are resiliently attached to the second slide to permit non-simultaneous engagement of workpieces at the two work stations.

It is an object of the invention to use the threaded screw with a brake applied to one jaw slide to position the movable jaws for non-symmetrical workstations.

It is another object of the invention to permit the movable jaws to be positively mounted to the respective slides but to be quickly releasable and replaceable.

It is still another object of the invention to permit the maximum jaw travel while maintaining positively seated jaws on the movable slides.

It is a further object of the invention to provide a plurality of off-set positions such that pre-release of one movable jaw prior to the release of the second movable jaw permits the handling of workpieces having varying configurations and degrees of tolerance with a minimum of cranking and uncranking to release the workpieces. Further, when used with parallels, the ledge is maintained support the workpiece when the workpiece is initially released.

BRIEF DESCRIPTION OF THE DRAWINGS

The invention will be described with reference to the drawings in which:

FIG. 9 is an exploded view of an off-set mechanism of the first embodiment;

FIG. 10A is a plan view of the detent of the first embodiment of the off-set mechanism as indicated by 10—10 in FIG. 9;

FIG. 10B is an interior view of an end cap of the first embodiment of the off-set mechanism as indicated by 10—10 in FIG. 9;

DETAILED DESCRIPTION OF THE PREFERRED EMBODIMENT

Figure 1:
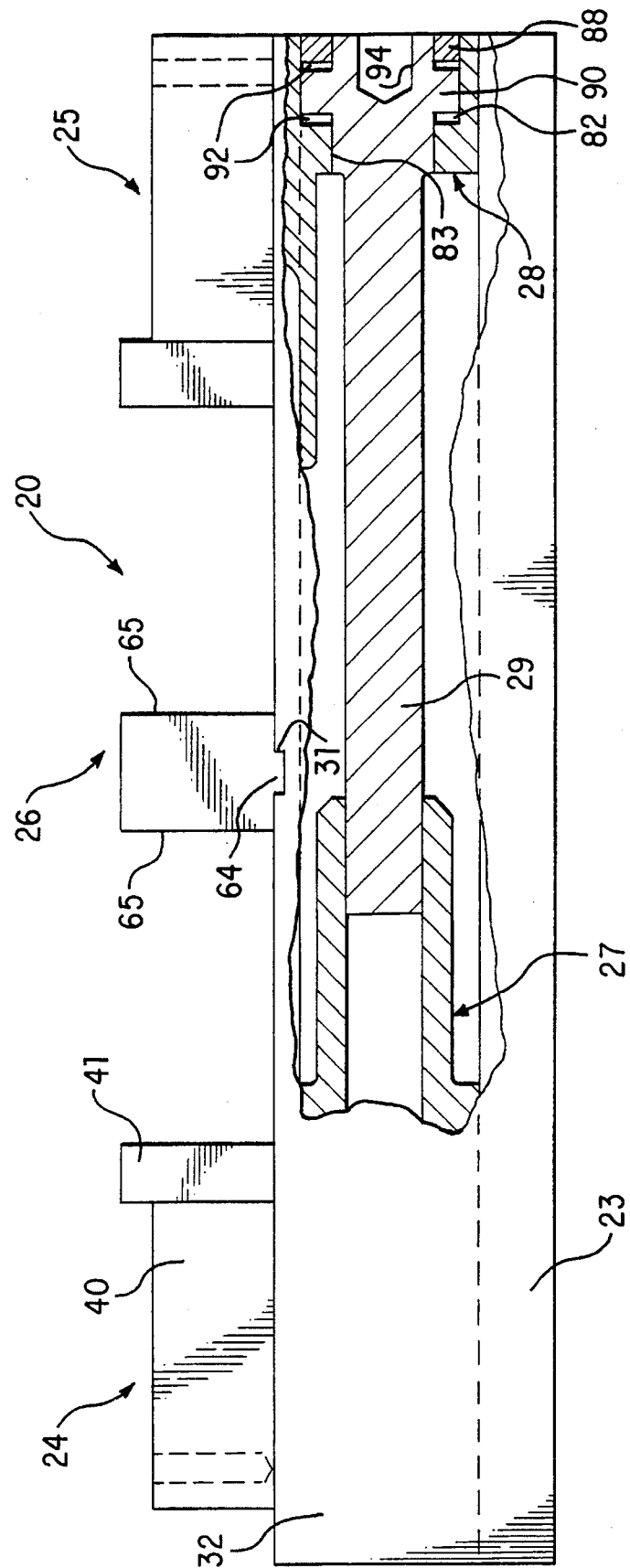
FIG. 1 is a side view of the invention partially cut away and partially in cross-section.
Figure 2:
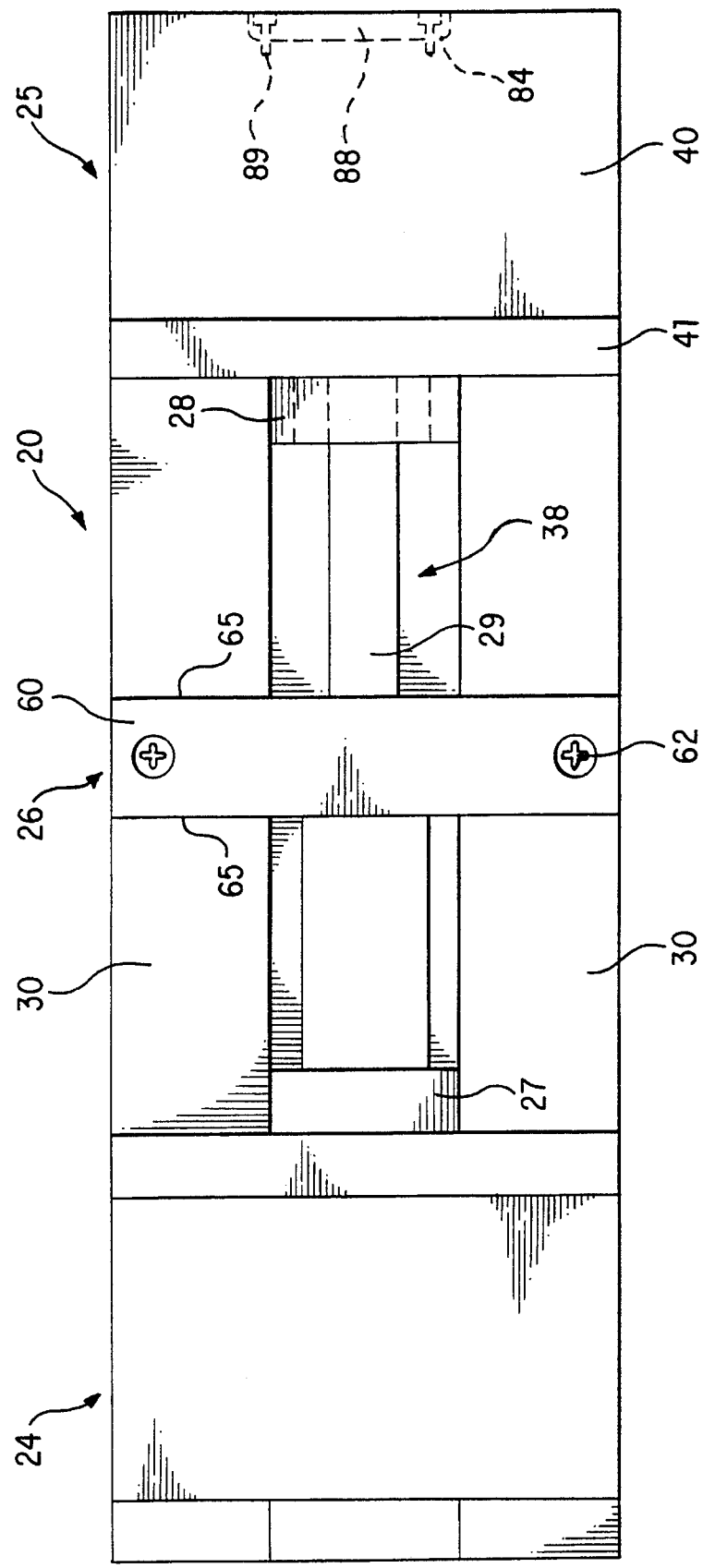
FIG. 2 is a plan view of the invention.
Figure 7:
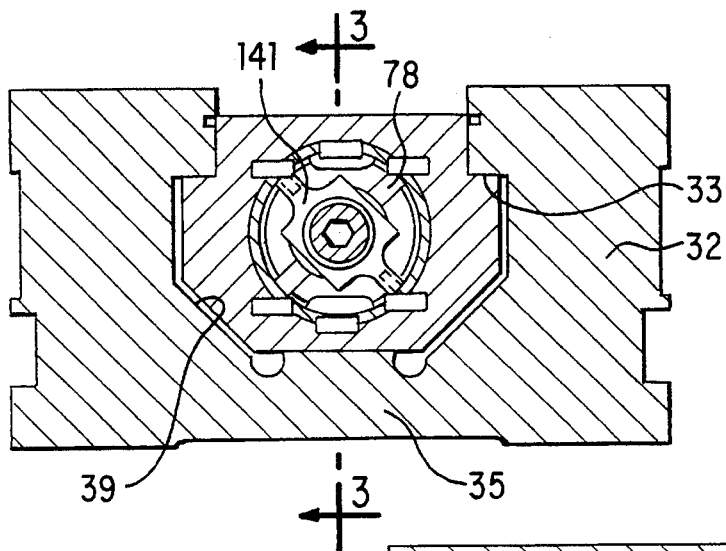
FIG. 7 is a cross-section of the off-set mechanism of the first embodiment as indicated by 7—7 in FIG. 3A.
Figure 6:
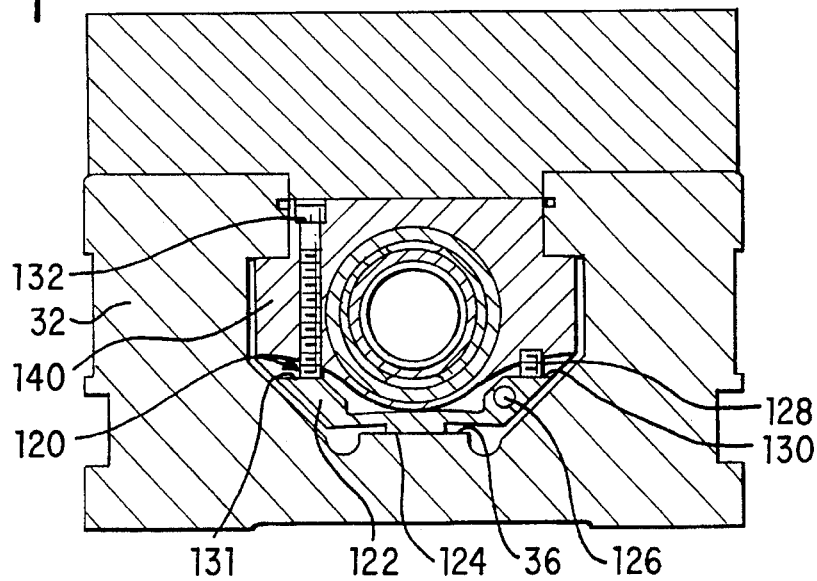
FIG. 6 is a cross-section of a first embodiment of an off-set mechanism and brake as indicated by 6—6 in FIG. 3A.
Figure 8:
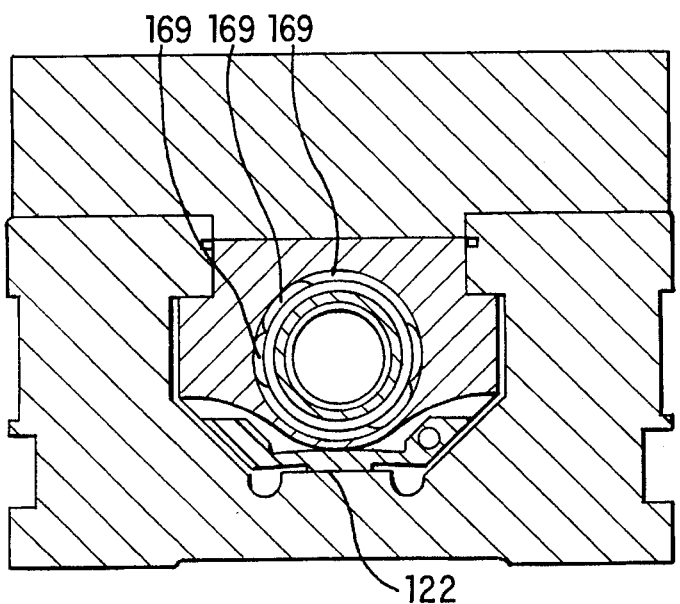
FIG. 8 is a cross-section of the off-set mechanism of the first embodiment as indicated by 8—8 in FIG. 3A.

A two-station machine vise, shown in FIGS. 1 and 2, and indicated generally at 20 has a vise body 23 with an elongated longitudinal central axis and a base 35. Although not shown, the outer surface for the base 35 may have projections or ears for mounting the body 23 to a work surface or may have other mounting features for mounting the vise to various machines used for machining operations. The sides 32 extend from the base 35 and have in-turned upper rails 30. The rails 30 define a channel 38 therebetween. A second, and larger, channel 39 (FIGS. 7 and 12) is formed below the rails 30. A contact surface (FIGS. 6 and 12) extends longitudinally along the bottom of the second channel 39.

At a center position of the body 23, transverse to the longitudinal axis, is a groove 31 that is cut into rails 30. A jaw block 60 of a stationary jaw 26 is removably mounted on and transverse to the rails 30 (FIGS. 1 and 2). An extension 64 of the jaw block 60 engages the groove 31. Further, the bolts 62 extend through bores in the jaw block 60 and are threadably received in bores in the rails 30 to fix the stationary jaw 26 in position. Not shown, are jaw plates that may be bolted to block faces 65 of the jaw block 60.

Opposing the stationary jaw 26 are movable jaws 24,25. The movable jaws 24,25 have a jaw block 40 mounted on body 101 (FIG. 5A) of the respective male and female slides 27,28. The jaw blocks 40, as can the jaw block 60, can be either soft or hard jaw blocks. When hard blocks are used, a jaw plate 41 is attached to the jaw block. 40 by means of bolts 42. Additionally, jaw parallels (not shown) such as those described in U.S. Pat. Nos. 4,923,186 and 5,037,075, the disclosures of which are incorporated by reference, may be used with the jaw plates 41 and those mounted to the jaw block 60 of the stationary jaw 26.

At the bottom of the jaw block 40 is a guide extension 45 that fits into the channel 38. The bottom surface of the guide extension 45 rests upon the top surface of the respective slide 27,28 and shoulders to either side of the guide extension 45 substantially rest on the upper surface of the rails 30.

To mount the jaw block 40 onto a slide 27,28, a recess 44 (FIGS. 5A–5C) extends into the under surface of the block 40. The recess 44 receives the body 101, of a jaw block retainer 100, to be discussed below, of the respective slide 27,28. In an end of the recess 44, away from the face of the jaw block 40 is a notch 48. A rod 46 inserted through a bore 53 in the jaw block 40 and having a planar surface is partially exposed at a forward end of the recess 44 closest to the jaw face of the jaw block 40. The planar surface is capable of limited rotation to allow the flat surface to adapt to a surface of the body 101 as described below. The length of the rod 46 is slightly greater than the width of the recess 44. The rod 46 is retained in jaw block 40 by means of either a pin 55 inserted through a slot in an end of the rod 46, the diameter of the pin 55 being less than the width of the slot, or by the pin 55 engaging a groove at one end of the rod 46 (not shown).

When soft jaws are used, the structure of the jaw block 40 provides a maximum area for machining of the upper surface of the jaw block 40 to accommodate workpieces having irregular shapes. Further, an alternative embodiment for a soft jaw block 40a is shown in FIG. 5C wherein each end of recess 44 has a notch 48 and a rod 46. This construction of the soft jaw block 40a permits the soft jaw to be machined at either end to provide a jaw face for different irregularly shaped workpieces. By permitting machining at both ends, economies are achieved.

Figure 5A:
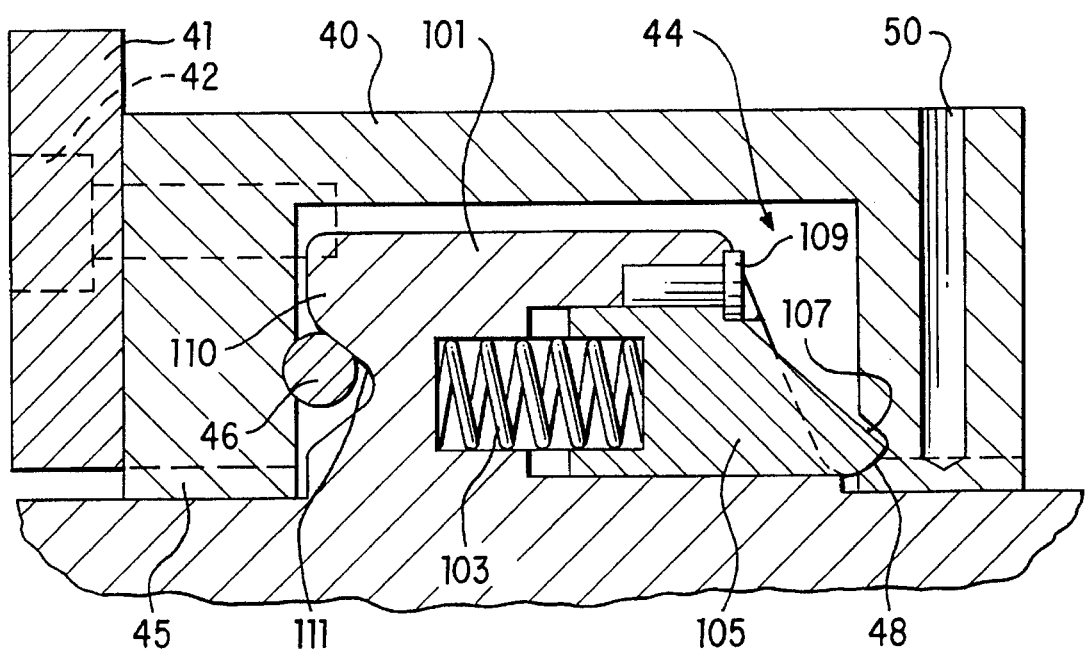
FIG. 5A is a cross-section of the jaw retainer of the first embodiment.
Figure 5B:
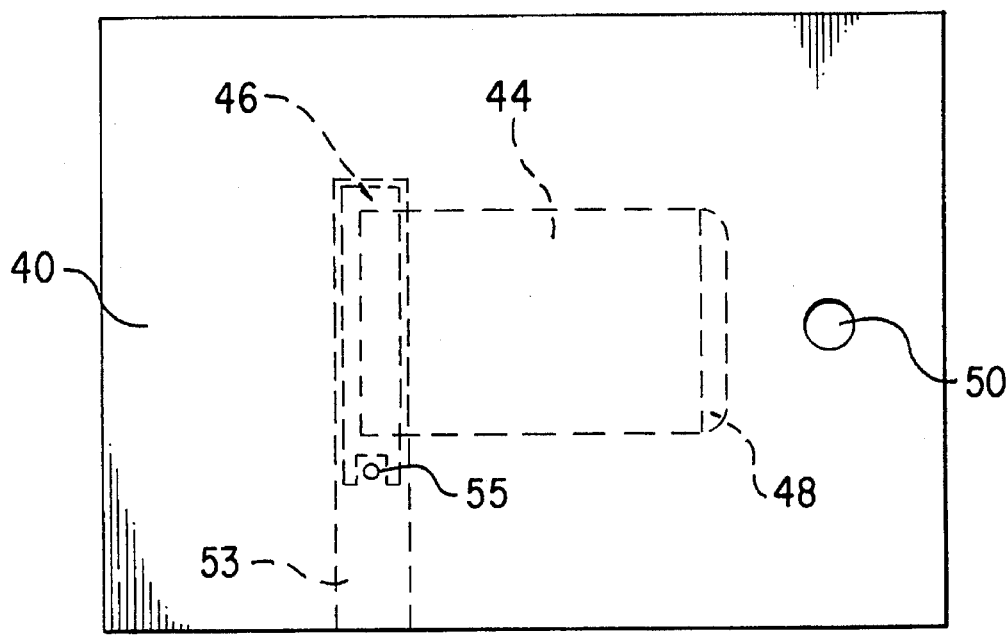
FIG. 5B is a plan view of a jaw block.
Figure 5C:
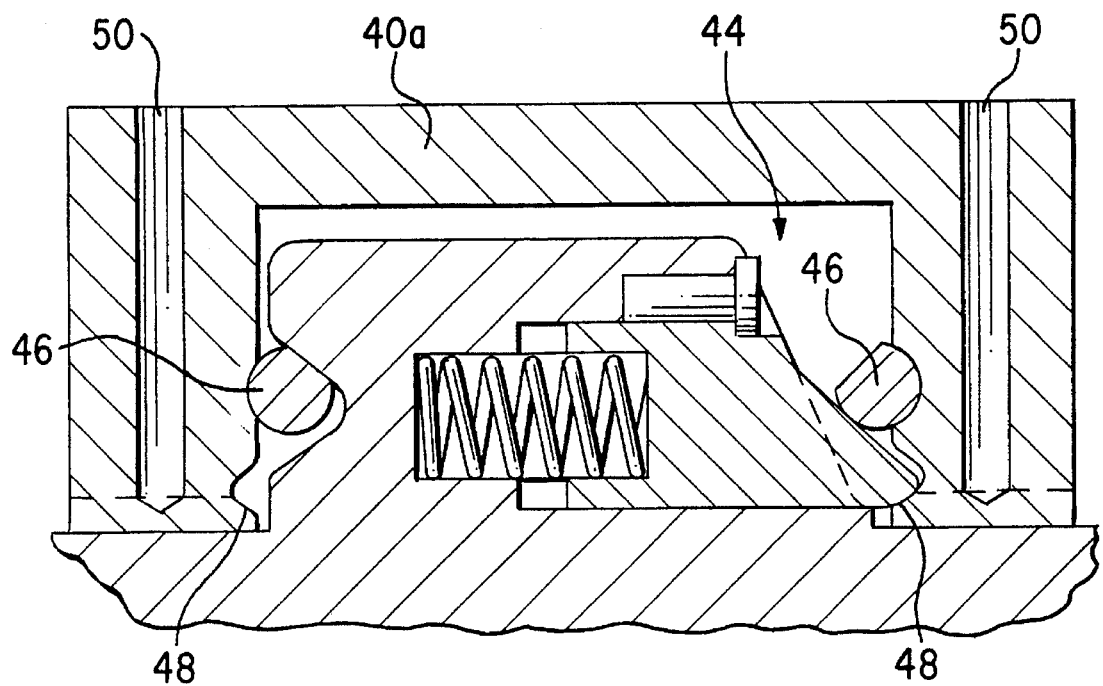
FIG. 5C is a cross-section of an alternate embodiment of a jaw block mounted on a jaw retainer of the first embodiment.

Shown in FIGS. 5A and 5C is a first embodiment of a jaw block retainer 100. As shown, a jaw block 40 is mounted to the body 101 of the jaw block retainer 100 of each of the respective male and female slides 27,28. The body 101 extends upwardly from the slide 27,28 through channel 38 between rails 30 (FIG. 5A). The body 101 has mounted, at a side away from the jaw face, a release mechanism therein. The release mechanism comprises a latch 105 and a spring 103 that are mounted in a bore in the body 101. Latch 105 is retained in the body 101 by means of a retainer screw 109. A forward end of the body 101, that is the end toward the face of the block 40, has an extension 110 with a sloped under surface 111. Under surface 111 is a part of a substantially V-shaped recess in the body 101 for accommodating rod 46.

The contact of the planar surface of the rod 46 is adapted to the surface of the body 101 and provides an angle lock that adds stability to the jaw block 40. When is applied to the face of the jaw block 40, the planar surface of the rod 46 rides down the under surface 111 of the body 101 to press the jaw block 40 against an upper surface of the slide 27,28. Rod 46 does not contact the lower surface of recess 108.

Figure 15:
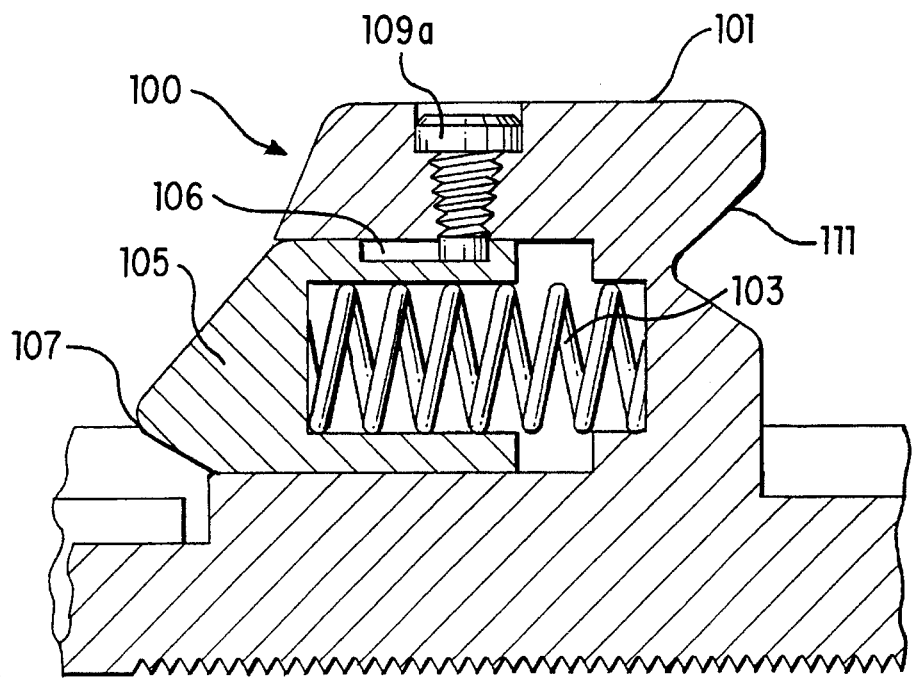
FIG. 15 is an enlarged view of the second embodiment jaw retainer shown in FIG. 14.

A second embodiment of the jaw block retainer 100 is shown in FIG. 15. Those parts of the jaw block retainer 100 that are the same as the first embodiment are identified by the same reference numbers and a description of those elements is omitted. In the second embodiment of the jaw block retainer 100, the latch 105 is retained in the body 101 by means of a retainer screw 109a. Retainer screw 109a is received in a threaded bore extending downwardly from an upper surface of body 101. A tip of retainer screw 109a is received in a groove 106 formed in an upper surface of latch 105. Groove 106 has sufficient width to enable the latch 105 to retract against the tension of spring 103. Either the first embodiment or the second embodiment of the block retainer 100 may be used with the invention. The second embodiment is preferred for ease in assembly and because the tension applied by spring 103 will not tend to cause retainer screw 109a to back out or become loose over time.

To mount jaw block 40 to body 101, of either embodiment, the forward part of recess 44 is placed over body 101. The planar surface of the rod 46 engages the sloped under surface 111 of the extension 110. The rear portion, that is the portion away from the jaw face, is then pushed down so that the latch tip 107 of the latch 105 engages the notch 48 to lock the block 40 onto the body 101. The jaw block 40 is removed by inserting a rod in the bore 50 and applying a force to the upper end of the rod. The force is applied in the direction of the stationary jaw 26 causing the rearward portion of the jaw block 40 to be unseated from the latch tip 107 of the latch 105 for easy removal of the jaw block 40.

The male slide 27 and the female slide 28 are moved by means of a threaded screw 29 (FIGS. 1 and 2). threaded screw 29 passes through a through bore 83 and is received in a receiving bore 82 of the female slide 28. A seating head 90, at one end of the threaded screw 29, is seated against a thrust bearing 92 and a second thrust bearing 92 is placed on the other side of the seating head 90. The entire assembly is retained within the female slide 28 by a retention plate 88 which is mounted to the female slide 28 by means of bolts 89. The retention plate 88 is seated in a recess 84 in the end surface of the female slide 28.

Figure 3A:
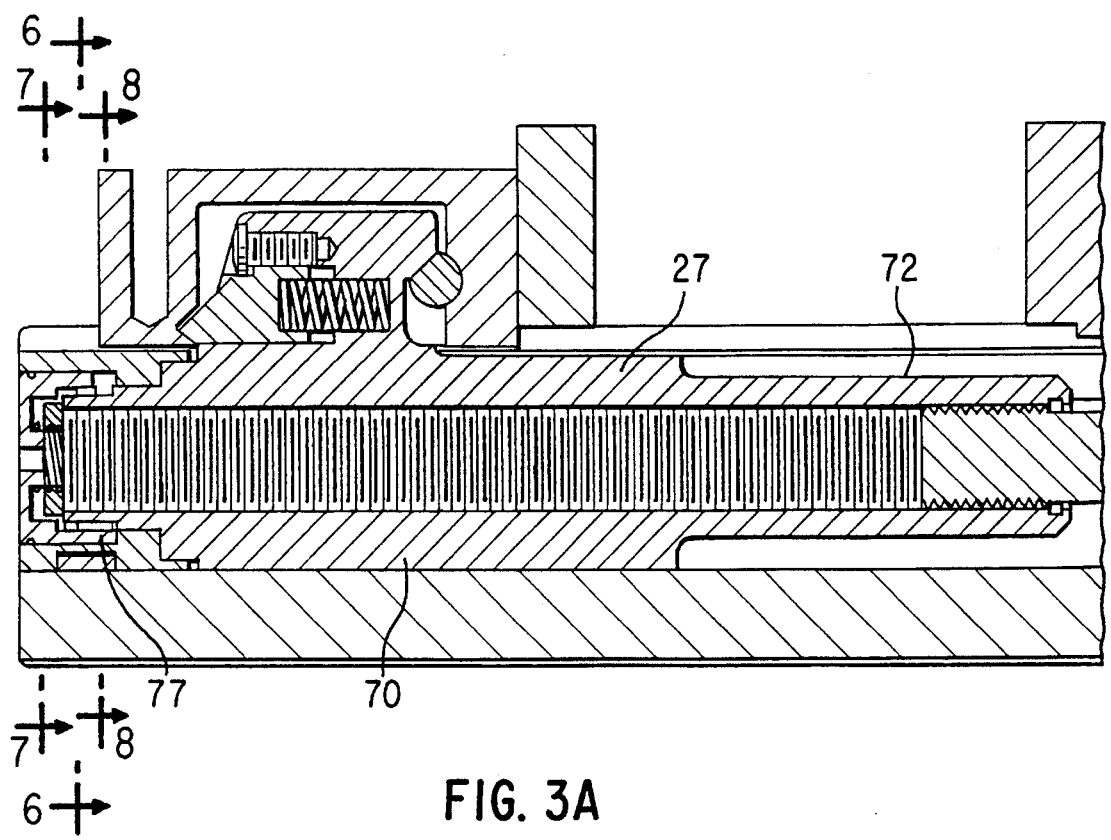
FIGS. 3A and 3B are a divided cross-section of a first embodiment of the invention in the fully opened position, the division occurring at the center of the stationary jaw.
Figure 3B:
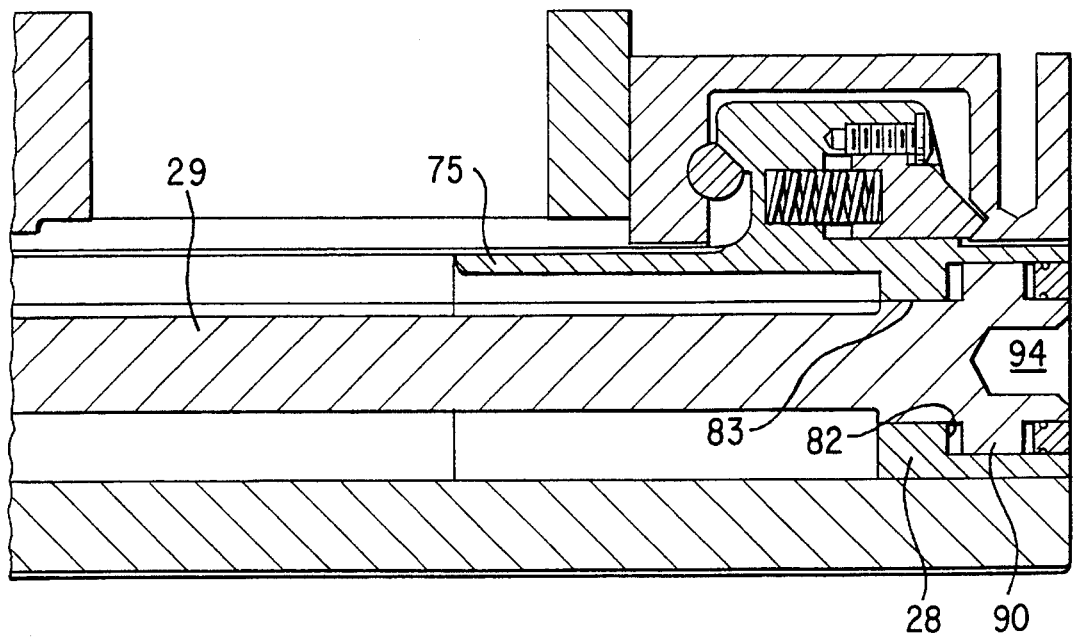
Figure 4:
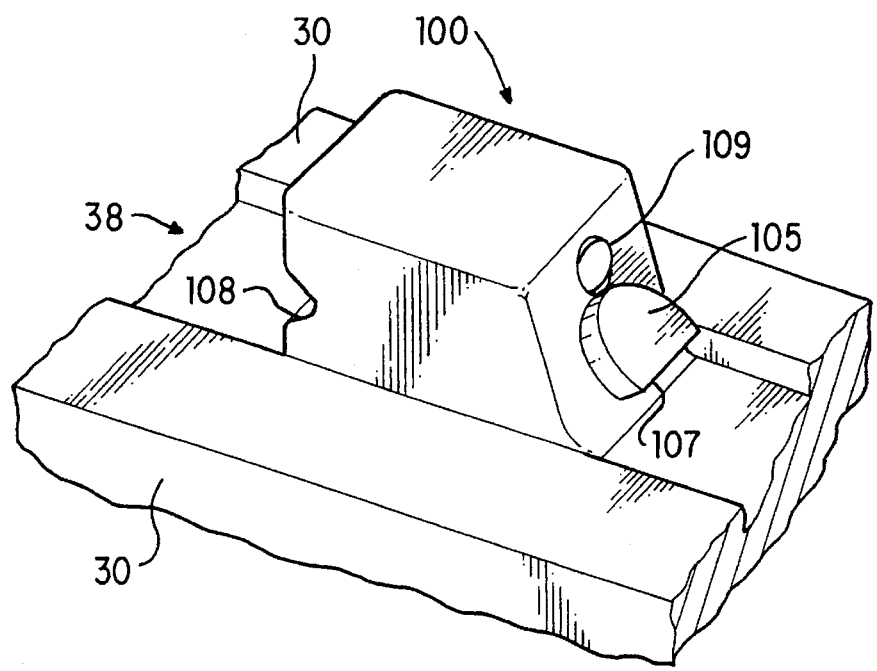
FIG. 4 is an angled view of the jaw retainer of the first embodiment.

A handle engager 94, shown in FIGS. 1 and 3B as a recess, can also be a projection. In the preferred embodiment, handle engager 94 is a polygonal shaped recess for receiving a complementary shaped rod having a handle at the opposite end of the rod. The rod is of sufficient length such that when the female slide 28, mounted in one end of the body 23, moves to bring the jaw plate 41 into contact with the stationary jaw 26, the handle may still be freely rotated without contacting the body 23.

The female slide 28 has a hood 75 spaced apart from but extending around threaded screw 29. The hood 75 provides increased strength to the female slide 28 as the upper surface of the hood 75 contacts the under surface 33 of the rails 30. Mounted at the opposite end of the base 23, in second channel 39, is the male slide 27. At an end toward the female slide 28, the male slide 27 has a bore extension 72 having an internally threaded bore 70 that extends through the male slide 27. The threaded screw 29 threadably engages the threaded bore 70. As the movable jaws 24,25 mounted to the male slide 27 and the female slide 28 respectively are moved toward engagement with stationary jaw 26, the bore extension 72 enters into the gap between the hood 75 and the threaded screw 29. This structure provides added travel and permits the movable jaws 24,25 to be brought into contact with the stationary jaw 26.

Figure 11:
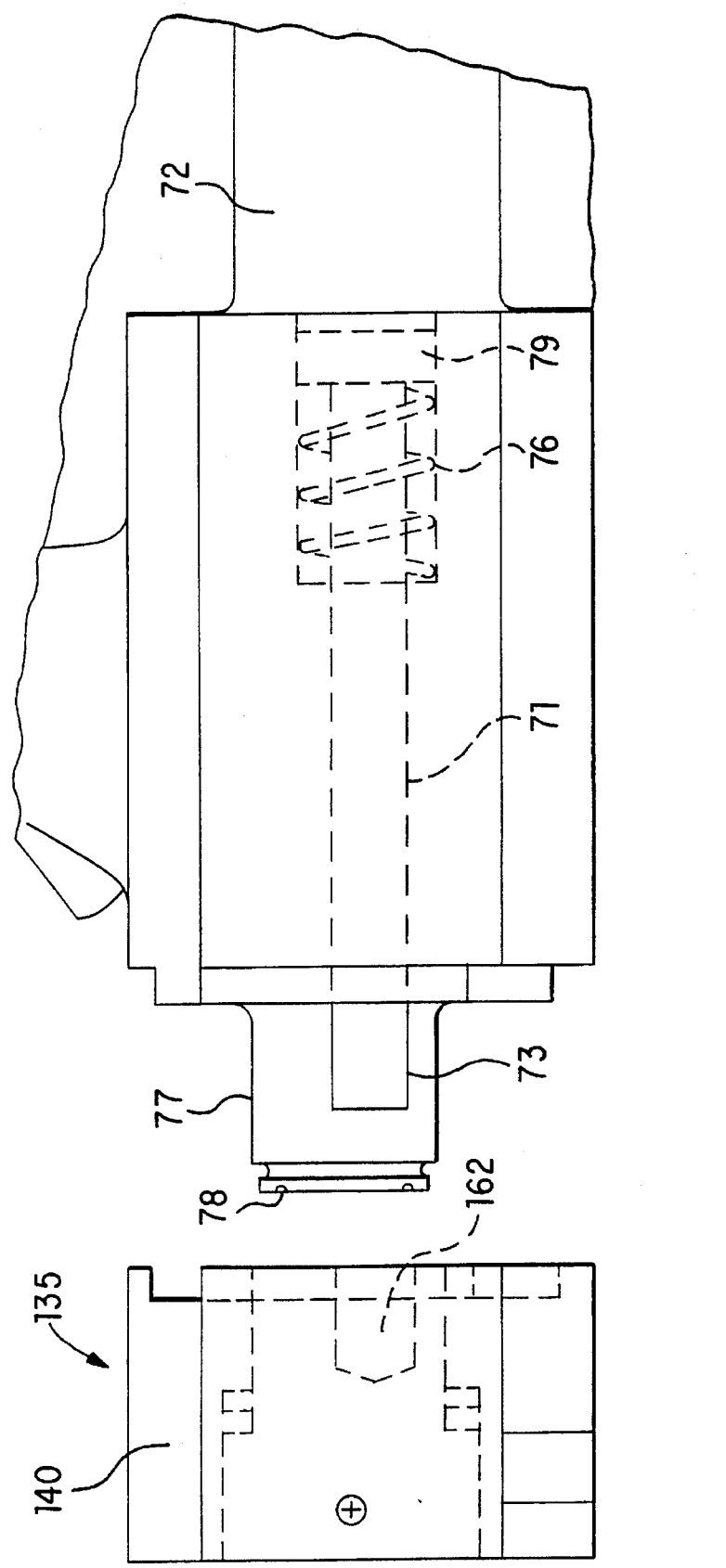
FIG. 11 is an exploded view of the off-set with attachment assembly of the first embodiment of the off-set mechanism.

Shown in FIGS. 9 and 11 is a first embodiment of an off-set mechanism 135. In the first embodiment, at the end of the male slide 27 from the bore extension 72, is a seat 164 with an off-set extension 77. Mounted to the off-set extension 77 is an off-set mechanism 135 which, in combination with the off-set extension 77, provides a first embodiment of an off-set assembly. The off-set mechanism 135 comprises an off-set body 140, a detent 141, a detent spring 142, and an end cap 143.

The off-set body 140 is received on the seat 164 of the male slide 27. The off-set extension 77 extends into a bore 161 of the off-set body 140. The off-set body 140 is maintained in position by a pair of bolts 73 passing through bolt bores 71 on either side of the male slide 27. Limit bores 162, having internal threads, receive the threaded bolts 73. Between each bolt head 79 and an end of an enlarged bore for receiving the bolt head 79 is a spring 76. The springs 76, in combination with the bolt heads 79, cause a recess 163 of the off-set body 140 to be drawn onto and seated on the seat 164 of the male slide 27.

Three pairs of notches 78 (FIGS. 7 and 9) are placed in the end of the off-set extension 77. The notches 78 of each pair are off-set from one another by 180°. One pair of notches 78 defines an axis perpendicular to the longitudinal axis of the body 23, the axis of this base pair of notches 78 passing through a midpoint of the channel 38 and the contact surface 36. A pair of the remaining two pairs of notches 78 are off-set at an angle of 45° to either side of the base pair of notches 78.

The end cap 143 has a spring seat 153 extending from its base into its interior and extending from the inner periphery of the end cap 143 are off-set protrusions 150. In the center of the spring seat 153 is an adjustment receptacle 155 for receiving an adjustment tool. The detent spring 142 is seated around spring seat 153. The detent 141 is placed over the detent spring 142, which is received in a spring counter bore 146 of the detent 141, so that detent arms 145 are seated in detent 151 of the end cap 143. The opposite sides of the detent arms 145 also engage a pair of notches 78 in order to set the off-set. The end cap 143 with the detent spring 142 and the detent 141 is inserted into the off-set body 140 so that off-set protrusions 150 are received in notches 144 of the off-set extension 77. The off-set extension 77 is seated in an off-set extension counter bore 159 of the end cap 143.

The end cap 143 is received in an end cap bore 165 of the off-set body 140. At the base of end cap bore 165 are a lip and two pairs of recesses. The lip and recesses form off-set sinks 169 which are engaged by the off-set protrusions 150. Each recess of a pair of recesses is off-set from the other by 180° and there is a separation of between pairs of recesses of 45° from a center line of each pair. The depth of the off-set sinks 169 determines the amount of off-set available.

When the end cap 143 is assembled to off-set body 140, the off-set projections 150 are aligned with notches 144. This permits ribs 152 of off-set projections 150 to pass over the end of the off-set extension 77. The end cap is then rotated clockwise at least 45°, and preferably 90°, to engage the ribs 152 in grooves 154 thereby attaching the end cap 143 to the off-set extension 77. With this rotation, the detent arms 145 are engaged with a base pair of notches 78 to establish a base off-set. Rotating the end cap 143 a predetermined number of degrees in either direction then sets the alternate off-sets. In the preferred embodiment, using three off-sets, the predetermined number of degrees is 45°. The rotation to engage the ribs 152 in the grooves 154 must be greater than the predetermined number of degrees to prevent an inadvertent disengagement of end cap 143 from the off-set extension 77. After the end cap 143 is engaged with the off-set extension 77, the off-set body 140 is positively attached to the male slide 27 using the bolts 73.

When the end cap 143 is inserted into the off-set body 140, a retention groove 157 opposes a socket head cap 167 threadably received a threaded hole and counter bore in the off-set body 140. The socket head cap screw 167 extends into the retention groove 157 of the end cap 143. Alternatively, a set screw or other retention structures, such as a detent pin that is received in the retention groove 57 for retaining the end cap 143 in the off-set body 140 while permitting it to rotate, are possible.

A brake assembly 120 (FIG. 6) is provided in the off-set body 140. The brake assembly 120 comprises a U-shaped brake 122 that is pivotally mounted, by means of a pin 126, in the off-set body 140. The brake 122 is transverse to the longitudinal axis of the body 23. A contact surface 124 is provided on the lower surface of the brake 122 to engage the contact surface 36 of the body 23. The contact surface 124 may be metal, as is the case with the brake 122 or may be a brake material adhered to the brake 122.

At the upper ends of the arms of the U-shaped brake are surfaces 130,131. Surface 130, which is adjacent the pivotal mounting located in one of the arms of the brake 122, contacts a spring 128 received in a recess in the off-set body 140. The spring 128 applies a pressure to the surface 130 to cause the brake 122 to pivot around the pin 126 and become recessed in the off-set body 140. A bolt 132, passing through a threaded bore in the off-set body 140, contacts the upper surface 131 of the second arm of the U-shaped brake 122. Adjustment of the bolt 132 causes the contact surface 124 of the brake 122 to engage the contact surface 36 of the body 23. When bolt 132 bottoms out, it loads spring pressure on the U-shaped brake 122 creating the tolerance necessary to promote even wear on the contact surface 124.

Shown in FIGS. 13, 14, 16 and 17 is a second embodiment of the off-set mechanism. Where features are the same as the first embodiment, the same reference numbers will be used and a description of those features is omitted. In particular, the off-set mechanism 135 of second embodiment is attached to the male slide 27 in the same manner as the off-set mechanism 135 of the first embodiment. Likewise, the brake assembly 120 of the second embodiment has substantially the same structure and operates in substantially the same manner as the brake assembly 120 of the first embodiment and, thus, these features are not described further.

Figure 17:
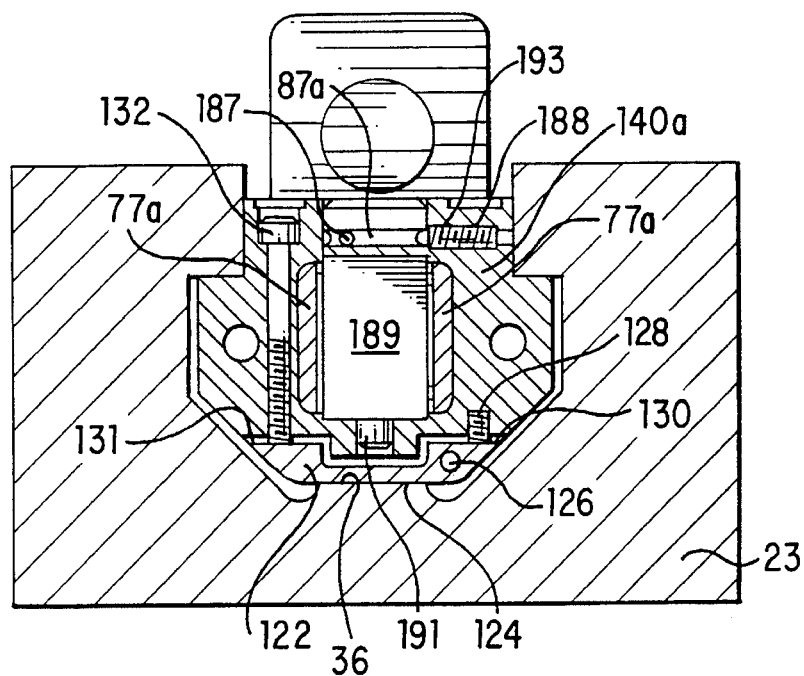
FIG. 17 is a cross-sectional view of the second embodiment of the off-set mechanism as viewed along line 17—17 of FIG. 13.

The second embodiment of the off-set mechanism 135 is mounted to the male slide 27. The male slide 27 has a seat 164 which receives a recess 163 in off-set body 240 of the second embodiment off-set mechanism 135. The male slide 27 also has an off-set extension 77a. The off-set extension 77a has a substantially square cross-section, as can be seen in FIG. 17, with the bore for receiving threaded screw 29 passing therethrough. A substantially square bore 180, shown in FIG. 16, passes from a top surface of the off-set extension 77a through a bottom surface of the off-set extension 77a. When the off-set body 240 is mounted to the male slide 27, a cylindrical body bore 190 which passes through off-set body 240 is aligned with bore 180.

An off-set cylinder 185 has a dial 186 on a top surface, an adjustment receptacle 195 in the center of the dial 186, a groove 187 housing detents 187 in an outer circumference of the off-set cylinder 185 immediately below the dial 186, a body 189 and a body pin 191 extending from the bottom surface of the body 189 along an axis of the off-set cylinder 185 and the body bore 190. The body pin 191 and the adjustment receptacle 195 are aligned and centered on the longitudinal axis of the off-set cylinder 185 and the body bore 190.

Figure 16:
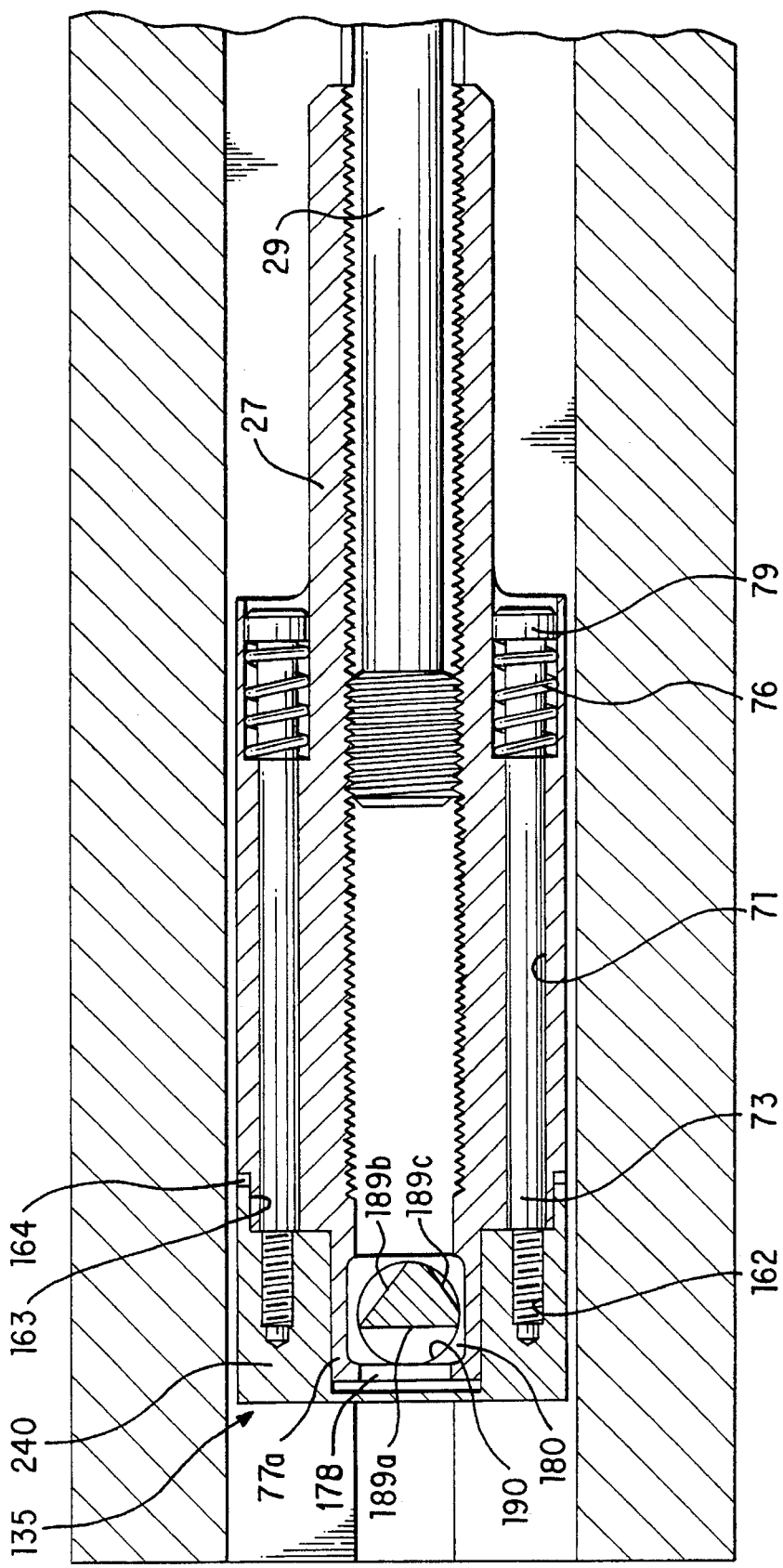
FIG. 16 is a cross-section view of the second embodiment of the off-set mechanism as viewed along line 16—16 of FIG. 12.

The body 189, when viewed in cross-section as seen in FIG. 16, has the appearance of a triangle with the apexes of the triangle being truncated. The body itself is eccentric to the axis of the off-set cylinder 185 and the body bore 190 and the apexes are truncated so that the body 189 may rotate within the body bore 190. The faces of the body 189 determine the off-sets. Face 189a permits off-set of ¼ of an inch, face 189b permits an off-set of ⅛ of an inch and face 189c allows an off-set of 1/32 of an inch in this embodiment although other off-sets could be applied as would be understood by one skilled in the art.

The off-set cylinder 185 is maintained in position within an upper portion of the body bore 190 by the dial 186 and detents 187 segment, a lower portion of the body 189 being received in a slight extension of the body bore 190 in the lower portion of off-set body 240. Further, the body pin 191 is received in a pin bore 192 which is aligned with the longitudinal axis of off-set cylinder 185 and the body bore 190. The seating of the off-set cylinder 185 in the body bore 190 and the body pin 191 in the pin bore 192 permits the off-set cylinder 185 to rotate but does not permit lateral movement.

Figure 14:
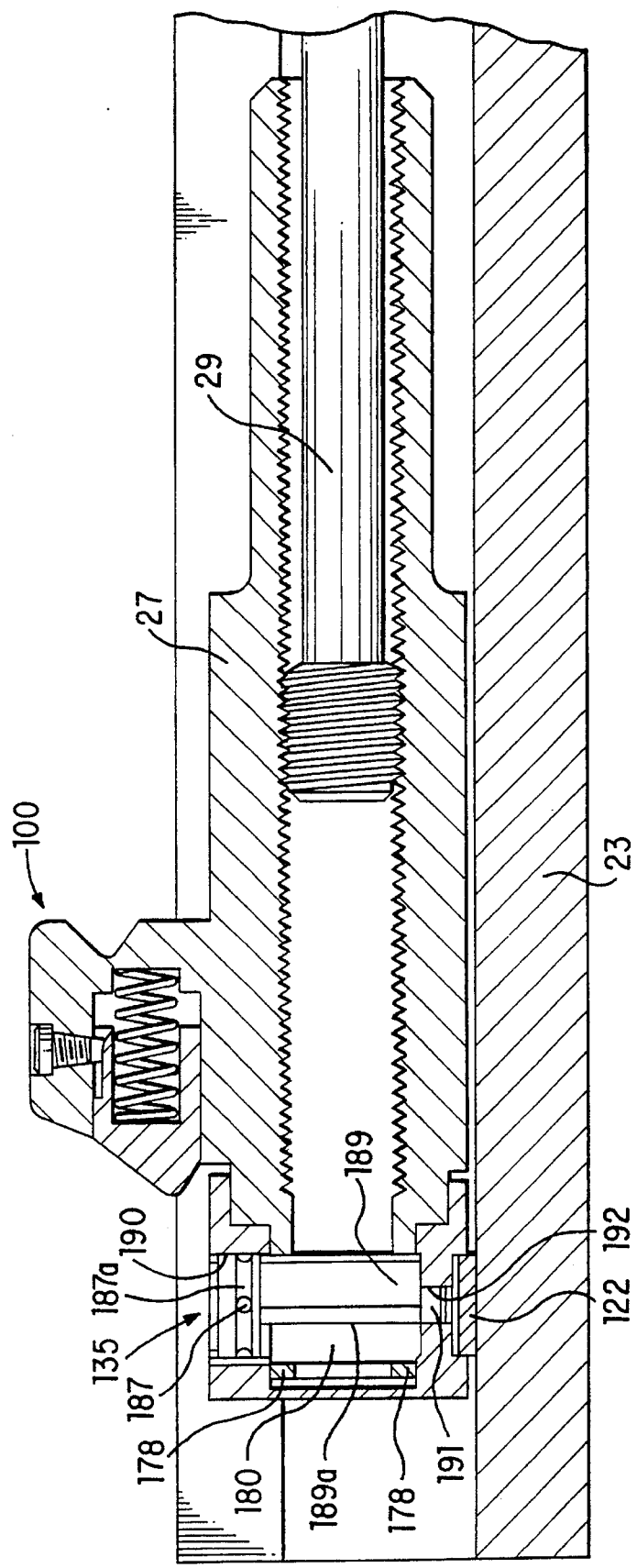
FIG. 14 is a cross-sectional view along line 14—14 of FIG. 12 showing the second embodiment of the off-set mechanism.

At the end of off-set extension 77a is an off-set extension end 178. The off-set extension end 178 may be a solid piece, if the threaded bore for receiving the threaded screw 29 is terminated in bore 180, or it may comprise top and bottom webs such as shown in FIG. 14. When the vise is used, it is the contact of the off-set extension end 178 with the face of body 189 that produces the off-set.

A detent assembly 188 is inserted through a bore 193 in an upper portion of the off-set body 240. The off-set assembly 188 is aligned so as to permit positive engagement with the detents 187. The end of the detent assembly 188 is received in the groove 187a to retain the off-set cylinder 185 in body bore 190. The detents 187 are positioned so as to align one of the faces of the body 189 with the off-set extension end 178 of the off-set extension 77a when engaged by the detent assembly 188. The detent assembly 188 is of a known structure and thus is not described further.

The dual-station vise having the structure described above of either the first or second embodiment of the off-set mechanism 135 can be operated to open and close the movable vise jaws such that a workpiece at one station is engaged first followed by the engagement of a workpiece at a second workstation. During release of the workpieces by backing off the movable jaws, the workpiece at the second workstation is released first and then the workpiece at the first workstation is released.

To prepare the vise for operation, a handle, not shown, is attached to the handle engager 94 and rotated to move the movable jaws 24,25 to their open most position. Because the brake 122 is engaged, the movable jaw 24 does not move initially and the movable jaw 25, attached to the female slide 28, is opened until it encounters a stop (not shown) at the end of the body 23. Because the female slide 28 can move no further, continued rotation of threaded screw 29, by the rotation of the handle, causes the movable jaw 24, mounted to the male slide 27, to be moved in the opening direction overcoming the resistance of the brake 122.

To remove the movable jaw 24 for maintenance, the jaw block 40 of the movable jaw 24 can be removed from the male slide 27 allowing access to the bolt 132. By backing off the bolt 132, the spring 128 forces the brake 122 to disengage from the contact surface 36.

Prior to closing the movable jaws 24,25, to engage the workpieces, the brake 122, if released, must be reset by tightening the bolt 132 to ensure that the contact surface 124 of the brake 122 engages the contact surface 36 of the body 23. Additionally, the operator must set the desired off-set.

In the first embodiment of the off-set mechanism 135, the off-set is established by inserting a wrench into the adjustment receptacle 155 and rotating the end cap 143. The rotation of end cap 143 positions detent arms 145 in one of the pairs of notches 78 in the off-set extension 77, each pair of notches 78 corresponding to an off-set dimension. Simultaneously, the off-set protrusions 150 are aligned with the off-set sinks 169 to establish the amount of off-set.

Figure 13:
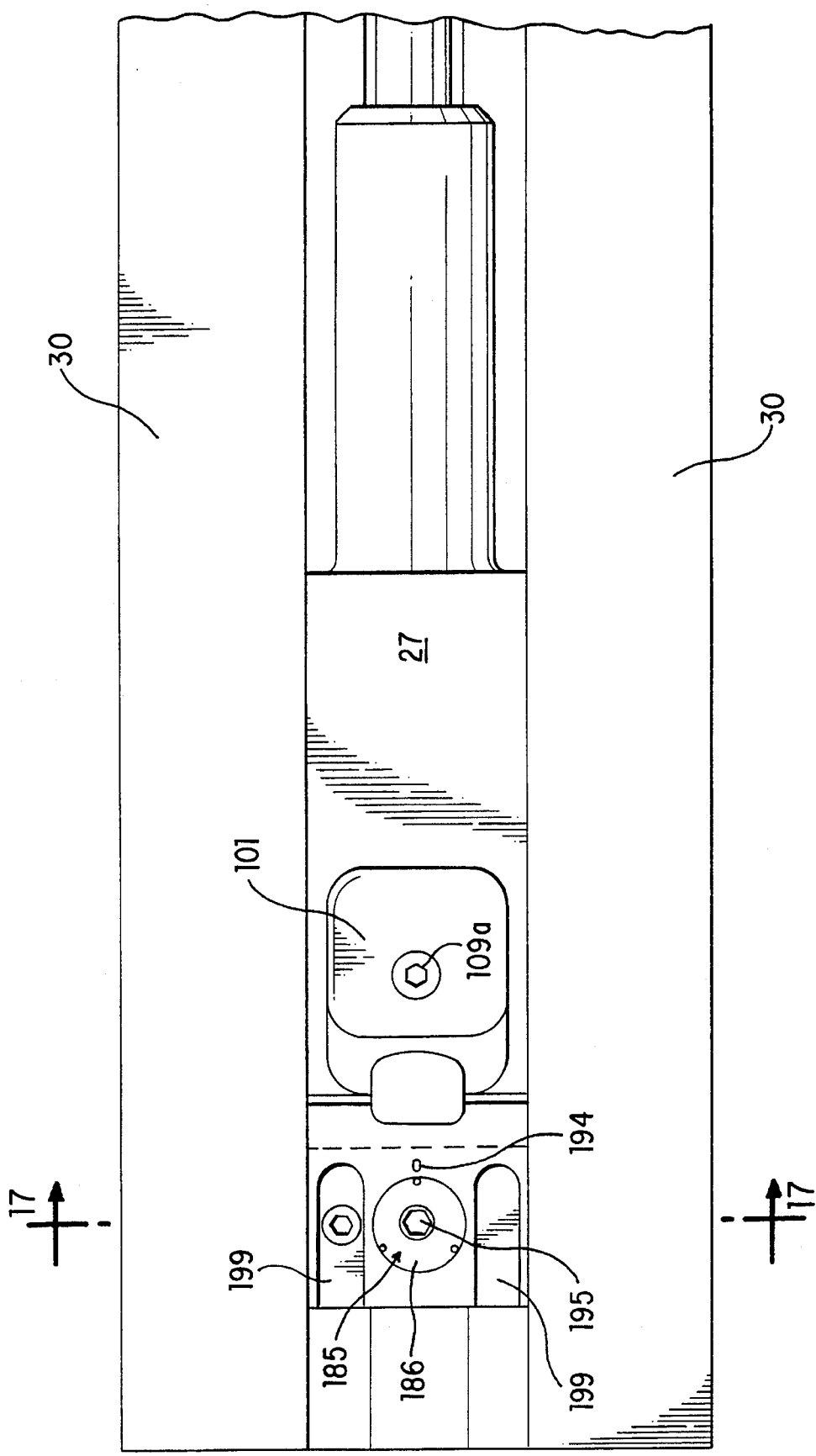
FIG. 13 is a plan view of the male slide of the invention having a second embodiment off-set mechanism and a second embodiment of a jaw retainer.

In the second embodiment of the off-set mechanism 135, the off-set is established by inserting a wrench into the adjustment receptacle 195 and rotating the dial 186 to align the desired off-set with an index mark 194 on an upper surface of the off-set body 240. When the off-set cylinder 185 is rotated, an appropriate face of the body 189 is aligned such that its face is parallel to a flat surface of the off-set extension end 178. As shown in FIGS. 14, 16 and 17, face 189a is so positioned and as shown in FIG. 13 the off-set is ¼ of an inch.

In the first embodiment of the off-set mechanism 135, the possible off-sets are ⅛, 1/16 and 1/32 inch. However, the invention is not limited to three off-sets nor is it limited to the off-sets of 1/32, ⅛ and ¼ inch as shown with the second embodiment of the off-set mechanism 135. As previously noted, other off-sets may also be used as would be obvious to one skilled in the art.

At this time, the operator ensures that the desired jaws, be they hard or soft jaws, necessary parallels, or other accessories, are mounted to the vise. Holding a first workpiece for clamping at a first workstation between the stationary jaw 26 and the movable jaw 25, mounted to the female slide 28, the handle is rotated and the female slide 28 is moved toward the stationary jaw 26 to engage the workpiece between the movable jaw 25 and the stationary jaw 26. When the first workpiece is engaged, male slide 27 commences movement overcoming the braking force provided by the brake 122. In so doing however, the off-set body 140 (or 240) is initially held in position while the male slide 27 commences closure. As a result the springs 76 are compressed by the heads of bolts 79 as the male slide 27 separates the off-set distance from off-set body 140 (or 240).

The amount of separation permitted is controlled by the off-set by the rotation of end cap 143 in the first embodiment of the off-set mechanism 135. Because the end cap 143 is engaged with the off-set extension 77 by the engagement of the ribs 152 in the grooves 154, the movement of the male slide 27 causes movement of end cap 143 to engage the off-set sinks 169.

In the first embodiment, as the male slide 27 pulls away from off-set body 140 prior to overcoming the resistance of brake 22, an opening in detent 141 allows spring seat 153 to pass therethrough.

When the end cap 143 has engaged the off-set sinks 169 of the off-set body 140, the off-set body 140 is caused to move in the closing direction. When the second workpiece is engaged and clamped between the movable jaw 24 and the stationary jaw 26, the off-set body 140 is held in position by the brake assembly 120. Thus, when action is taken to open the jaws, the male slide 27, as a result of the expansion of the springs 76, is caused to open first by the off-set amount. Thus, the second workpiece may be removed. Further rotation of the handle causes the female slide 28 to move as the male slide 27 is held in position by the brake assembly 120. As a result, the first workpiece is released.

In the second embodiment of the off-set mechanism 135, that is in the preferred embodiment, the amount of separation permitted is controlled by the off-set set by the rotation of the dial 186. Rotating the dial 186 aligns the desired one of the faces of the body 189 with the off-set extension end 178 of the off-set extension 77a. Thus, in the second embodiment, as the male slide 27 pulls from the off-set body 240, prior to overcoming the resistance of the brake assembly 120, the off-set extension end 178 is drawn forward until it contacts the face of the body 189. When the off-set extension end 178 has contacted the face of the body 189, the resistance of the brake is overcome and the off-set body 240 is caused to move in the closing direction.

When the second workpiece is engaged and clamped between the movable jaw 24 and the stationary jaw 26, the off-set body 240 is held in position by the brake assembly 120. When action is taken to open the jaws, the male 27 is caused to open by the off-set amount as discussed above with respect to the first embodiment.

Although the action has been described as requiring both movable jaws to be moved to the fully open position, it is necessary only to move the movable jaw 25, attached to female slide 28, to the stop position which in turn forces movement of the male slide against the resistance of the brake 122 to open a distance sufficient to allow insertion of the second workpiece and establish the desired off-set.

Another modification made to the vise concerns the mounting of the stationary jaw 26. Rather than having a groove 31 transverse to the longitudinal body of the axis of the vise body 23 into which an extension 64 of the jaw block 60 of the stationary jaw 26 is inserted, receptacles 231 and 232 may be cut into the rails 30 of the vise body 23. The receptacle 231 is a closed receptacle, that is one that has portions of rail 30 completely enclosing the sides of the receptacle 231. The receptacle 232 has portions of rail 30 enclosing three sides of the receptacle 232. A fourth side of the receptacle 232 is open at the side of the vise body 23. A bore 240 is provided in each rail 30 for receiving a mounting bolt (not shown) for holding the stationary jaw 26 in position.

Figure 19:
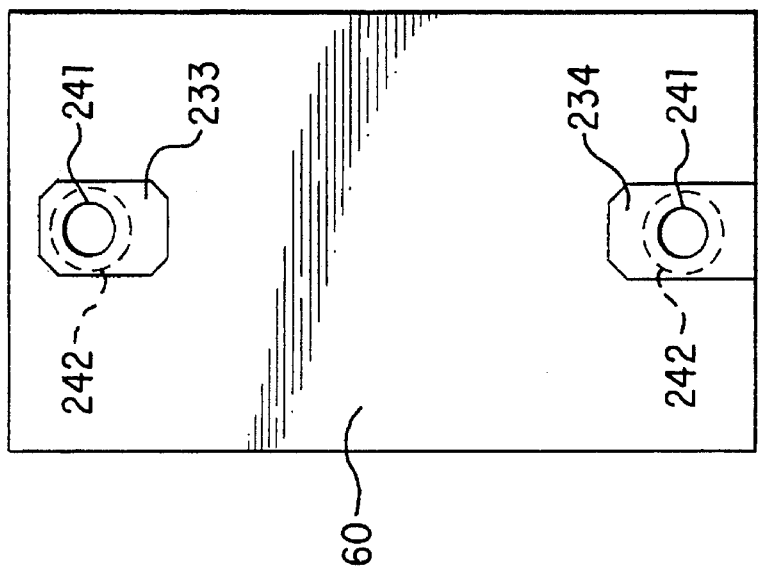
FIG. 19 is a view of the bottom of the stationary jaw for mounting on the vise of FIG. 18.
Figure 18:
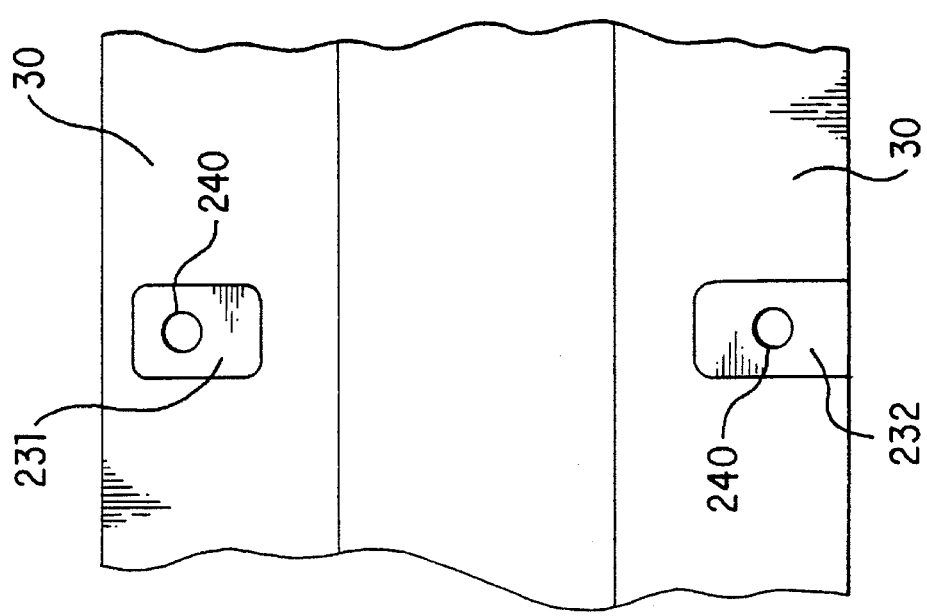
FIG. 18 is a plan view of a portion of the vise where the stationary jaw is mounted with an alternative key pattern.

The jaw block 60, rather than having extension 64, has protrusions 233 and 234. The protrusions 233 and 234 are shaped to be received in the receptacles 231 and 232, respectively. Passing through each of the protrusions 233, 234 is a bore 231 for receiving the mounting bolts. On an upper surface of the jaw block 60 are recesses 242 for recessing the heads of the mounting bolts when the stationary jaw 26 is mounted to the vise body 23. As shown in FIGS. 18 and 19, the corners of the receptacles 231,232 are rounded while the corners of the protrusions 233,234 are chamfered. Such corners are not required but are more easily machined, particularly the chamfered corners of protrusions 233,234. Such an arrangement of protrusions 233,234 and receptacles 231,232 preclude mounting the stationary jaw 26 with any but one orientation. This facilitates machining reset-up should it be necessary to remove the stationary jaw 26 and subsequently reset it.

Another modification made to the vise concerns the manner in which jaw blocks 40 are removed from the associated male or female slides 27,28. As shown in FIG. 1, with respect to movable jaw 25 which uses female slide 28, the jaw block extends substantially to the end of the appropriate slide to which it is mounted. This can also be seen in FIG. 3B. Alteratively, the jaw block may terminate slightly short of the end of the slide, or as shown in FIG. 3A, slightly before the end of the offset mechanism mounted to male slide 27. It is preferred that the jaw blocks extend to the ends of the slides, that is to include the offset mechanism, but in the case of the male slide 27, the jaw block must extend a sufficient distance to cover the gap between the offset block and the male slide 27 when such exists (as shown in FIG. 3A).

Figure 12:
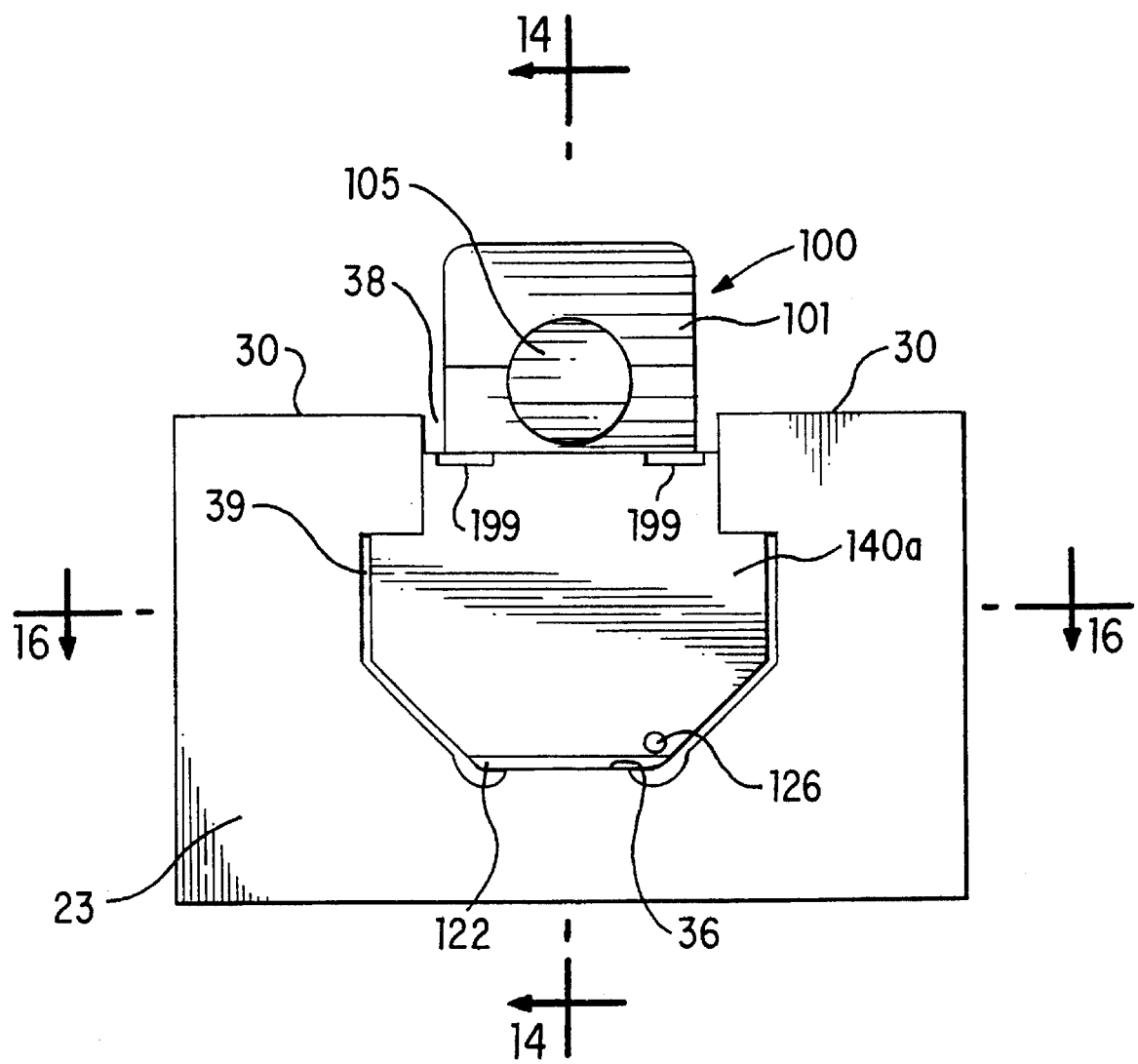
FIG. 12 is an end view of the invention with a second embodiment of the jaw retainer.
Figure 20:
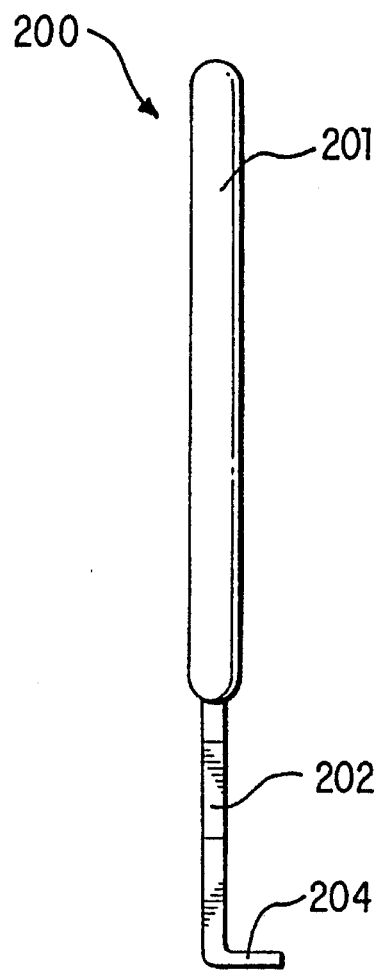
FIG. 20 is a side view of a jaw block pry wrench.
Figure 21:
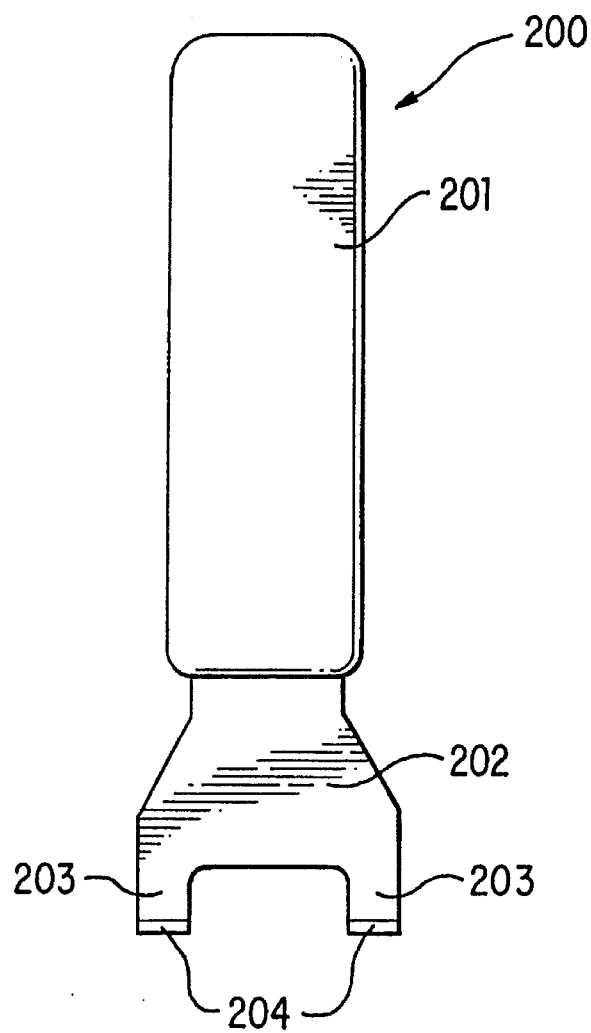
FIG. 21 is a front view of the jaw block pry wrench.

As shown in the first embodiment, a rod is inserted into a bore 50 and pressure is applied to the rod to remove the jaw block 40 from the associated slide. In this alternative means for removal of the jaw block 40, wrench grooves (as shown in FIGS. 12 and 13) 199 are provided on an upper surface of the off-set body 240 and the upper surface of female slide 28. A pry wrench 200, shown in FIGS. 20 and 21, comprises a handle 201, a wrench body 202, two tines 203 extending from the wrench body 202. The tines 203 are spaced apart a distance equal to the spacing between the wrench grooves 199 provided in the upper surface of the off-set body 240 and the female slide 28. A lift foot 204 extends at a right angle to each of the tines 203. Thus, the lift feet 204 are inserted in the grooves 199 in the upper surface of the off-set body 240, or female slide 28, immediately below the jaw block 40. By pulling on the handle, an upward pressure is asserted on the undersurface of the jaw body 40 thereby causing the notch 48 in the jaw block 40 to disengage from the latch 105 of the appropriate slide 27,28.

Although the invention has been described with great particularity, the invention is not limited to the description as other variations, such as the number of off-sets, reversing the mounting of the threaded screw and the off-set assembly with respect to the male and female slides, manner of creating the off-sets and manner of fixing the end cap to the slide are possible. Likewise, either embodiment of the jaw block retainer or means for removing the jaw block from the slide can be used with either embodiment of the off-set mechanism. Further, the snap-lock concept for mounting the jaw block to the movable slides is applicable to a single station vise or multi-station vises.

What is claimed is:

1. A vise assembly, comprising:

a body having means for guiding movable vise jaws thereon;

a stationary jaw removably mounted at a mid-point on said body, said stationary jaw having oppositely facing jaw surfaces;

a first movable slide and a second movable slide mounted in said means for guiding movable vise jaws, each said slide having a jaw removably mounted thereto, each said jaw having a jaw surface facing one of said stationary jaw surfaces and being movable toward and away from said stationary jaw by movement of said first and second movable slides respectively, and an off-set assembly attached to said second movable slide, said off-set assembly comprising:

an extension extending from an end of said second movable slide that is away from said stationary jaw, said extension having a bore passing therethrough, said bore having an axis that intersects at a right angle to a longitudinal axis of said body;

an off-set mechanism having an off-set body seated on said extension;

off-set setting means mounted in said off-set body for establishing an amount of off-set;

retention means for separably attaching said off-set mechanism to said second movable slide; and a brake assembly for resisting movement of said off-set mechanism during movement of said second movable slide until separation resulting from said retention means is accommodated.

2. The vise assembly as claimed in claim 1, further comprising means for mounting said stationary jaw to said body such that said stationary jaw can only be mounted in one way.

3. The vise assembly as claimed in claim 2, wherein said body has two rails and said means for mounting comprises:

a receptacle in each rail, each receptacle dissimilar from the other receptacle; and a pair of projections extending from an underside of said stationary jaw, each projection dissimilar from the other projection but each projection complimentary to a one of the receptacles on said rails.

4. The vise assembly as claimed in claim 1, wherein said off-set body has a bore extending therethrough, said bore in said off-set body having a cross-section within an inner perimeter of said bore in said extension.

5. The vise assembly as claimed in claim 4, wherein said off-set setting means comprises:

a setting body rotatably mounted in said bore of said off-set body;

a dial on an end of said setting body to identify a selected off-set; and retention means for retaining said setting body in said bore in said off-set body and for holding said setting body at the selected off-set.

6. The vise assembly as claimed in claim 5, wherein said setting body has at least two off-set positions.

7. The vise assembly as claimed in claim 5, wherein said setting body has three off-set positions.

8. The vise assembly as claimed in claim 7, wherein said setting body has a cross-section having a triangular shape with the apexes of the triangle removed, the setting body having an eccentric axis such that each triangle face defines an off-set.

9. The vise assembly as claimed in claim 1, wherein said removable mounting of said movable jaws to said slides comprises:

a slide head projecting upwardly from a slide body;

a latch mechanism mounted in said latch head, wherein said slide head has a projection with a sloped under surface at one end and said latch mechanism projects from an opposite end of said slide head.

10. The vise assembly as claimed in claim 9, wherein said latch mechanism comprises a spring received in a bore in said latch head;

a latch piece received in an opening in said slide head such that said spring is engaged between said latch piece and an end of said bore, said latch piece having a groove on an upper surface, and a screw passing through said slide head to engage said groove to retain said latch piece in said opening.

11. The vise assembly as claimed in claim 10, wherein each said removable jaw has a recess for receiving said slide head, said recess having a rod with a planar surface passing therethrough at one end and a notch at an opposite end.

12. The vise assembly as claimed in claim 11, wherein said planar surface of said rod engages said sloped under surface of said projection of said slide head and said notch is engaged by said latch piece of said slide head.

13. The vise assembly as claimed in claim 1, wherein said brake assembly comprises:
- a U-shaped brake member received in a recess in said off-set body, said recess facing a bottom surface of a vise guide channel;
- a pin passing through said off-set body parallel to the longitudinal axis of said body and engaging an arm of said U-shaped brake member to provide a pivotal mount, said pin on a side of said arm closest to a center of said U-shaped brake;
- a spring received in a recess in said off-set body so as to contact an end of said arm of said U-shaped brake member providing the pivotal mount, said end being further from a center of said U-shaped brake member than said pin; and
- a screw theadably received in said off-set body so as to contact an upper surface of a second arm of said U-shaped brake member.

14. The vise assembly as claimed in claim 1, further comprising a mounting assembly for mounting said stationary jaw to said body wherein said body has two parallel rails, said mounting assembly comprising:
- a receptacle in each rail, each receptacle dissimilar from the other receptacle; and
- a pair of projections extending from an underside of said stationary jaw, each projection dissimilar from the other projection but each projection complimentary to a one of the receptacles on said rails.

15. The vise assembly as claimed in claim 1, further comprising a latching mechanism for mounting a jaw to said first and second movable slides, said latching mechanism comprising:
- a slide head projecting upwardly from a slide body of each of first and second said movable slides;
- a latch mechanism mounted in said slide head, wherein said slide head has a projection with a sloped under surface at one end and said latch mechanism projects from an opposite end of said slide head, wherein said latch mechanism comprises a spring received in a bore in said slide head;
- a latch piece received in an opening in said slide head such that said spring is engaged between said latch piece and an end of said bore, said latch piece having a groove on an upper surface, and
- a screw passing through said slide head to engage said groove to retain said latch piece in said opening.

16. The vise assembly as claimed in claim 15, wherein said jaw has a recess for receiving said slide head, said recess having a rod with a planar surface passing therethrough at one end and a notch at an opposite end.

17. The vise assembly as claimed in claim 16, wherein said planar surface of said rod engages said sloped under surface of said projection of said slide head and said notch is engaged by said latch piece of said slide head.

18. The vise assembly as claimed in claim 1, wherein said offset body has a pair of spaced apart grooves in an upper surface thereof and the vise assembly further comprises a pry wrench having means for entering said grooves between said offset body and said jaw to enable removal of said jaw from an associated movable slide.

* * * * *